United States Patent [19]

Tukihara

[11] Patent Number: 5,328,742
[45] Date of Patent: Jul. 12, 1994

[54] ROD AND METHOD OF MANUFACTURING SAME
[75] Inventor: Takayuki Tukihara, Sakai, Japan
[73] Assignee: Shimano Inc., Osaka, Japan
[21] Appl. No.: 893,005
[22] Filed: Jun. 3, 1992
[30] Foreign Application Priority Data Jun. 5, 1991 [JP] Japan ................... 3-133913

[51] Int. Cl.$^5$ .............................................. A01K 87/00
[52] U.S. Cl. .................... 428/105; 43/18.1;
138/174; 138/177; 428/36.3; 428/36.9;
428/36.91; 428/109; 428/113; 428/192;
428/212; 428/220; 428/902
[58] Field of Search ............ 428/105, 109, 113, 36.9,
428/36.91, 37, 36.3, 192, 212, 220, 902, 408;
43/18.1; 273/80 B; 138/174, 177, 118

[56] References Cited
U.S. PATENT DOCUMENTS

| 4,083,140 | 4/1978 | Van Auken | 43/18.5 |
| 4,381,960 | 5/1983 | Pinter et al. | 156/175 |
| 5,188,152 | 2/1993 | Ogawa | 43/18.5 |

FOREIGN PATENT DOCUMENTS 004538 10/1979 European Pat. Off. .

1182933 8/1986 Japan ................... 43/18.5

OTHER PUBLICATIONS

Patent Abstracts of Japan, Pub. No. JP2171130; Pub. Date Feb 7, 1990.
Patent Abstracts of Japan, Pub. No. JP2078532; Pub. Date Mar. 19, 1990.
Patent Abstracts of Japan, Pub. No. JP148138; Pub. Date Jun. 9, 1989.

*Primary Examiner*—Ellis P. Robinson
*Assistant Examiner*—Nasser Ahmad
*Attorney, Agent, or Firm*—Dickstein, Shapiro & Morin

[57] ABSTRACT

A rod includes an inner layer and an outer layer. The inner layer is formed by winding on a mandrel a prepreg sheet including reinforcing fibers oriented axially of the rod and having a width extending over an entire length of the rod. The outer layer is formed by winding a prepreg tape including reinforcing fibers oriented longitudinally thereof. The prepreg tape is wound a plurality of times over the prepreg sheet from a tip end region to a butt end region of the rod. Adjacent winds of the prepreg tape partly overlap each other in the tip end region, and are spaced from each other axially of the rod in the butt end region.

4 Claims, 3 Drawing Sheets

ROD AND METHOD OF MANUFACTURING SAME

BACKGROUND OF THE INVENTION

1. Field of the Invention

The present invention relates to a rod and a method of manufacturing the rod. More particularly, the invention relates to a fishing rod having an inner layer formed of a prepreg sheet including reinforcing fibers oriented in one direction and having a width extending over an entire length of the rod, and an outer layer formed of a prepreg tape including reinforcing fibers oriented in a direction different from the one direction and having a width smaller than the length of the rod, the prepreg tape being wound over the entire length of the rod, and to a method of manufacturing such a rod.

2. Description of the Related Art

Generally, one section of a telescopic rod or an add-on type rod is formed of three prepreg layers (each layer including one to several plies) having reinforcing fibers. The reinforcing fibers of one layer extend perpendicular to those of an adjacent layer. In the case of a thin rod section such as a tip end section, the three layers would result in excessive rigidity. To avoid this, a prepreg sheet including reinforcing fibers oriented axially of the rod section and corresponding to an entire width of the rod section is wound to form a single layer (e.g. 0.1 to 0.25 mm thick) to check a spring-back (into a C-shape) occurring when wound thick. Then, a prepreg tape is wound, with reinforcing fibers oriented circumferentially of the rod section, to form an outer layer. This construction provides a thin rod section. The prepreg sheet may be internally lined with a layer of thin glass cloth, though it is a rare case.

However, where the prepreg tape is used to form the outer layer as above, its winding pitch is the question. That is, if the tape is wound too closely over the entire length, the entire rod may become too rigid and inflexible to cope with a sudden pull of fish. Conversely, if the tape is wound too sparsely over the entire length, gaps between adjacent winds of the prepreg tape (especially in a thin tip end region) could be damaged through contact with rocks or other objects on the shore, thereby impairing strength.

SUMMARY OF THE INVENTION

The object of the present invention is to provide a rod and a method of manufacturing the rod which has appropriate degrees of flexibility and rigidity and free from a marked deterioration in strength while retaining the advantage of facilitating prepreg winding in a way to check a spring-back.

The above object is fulfilled, according to the present invention, by the feature that a prepreg tape is wound to have adjacent winds partly overlapping each other in a tip end region of the rod, and spaced from each other axially of the rod in a butt end region of the rod.

The present invention provides the following function and effect.

In the thin tip end region, the tape is wound to have adjacent winds overlapping each other to conceal the inner layer. This minimizes possibility of damage done to the inner layer by contact with rocks or other objects on the shore. In the butt end region, the prepreg tape is wound to have adjacent winds spaced from each other axially of the rod. This avoids an increase in rigidity and loss of flexibility occurring where the tape is wound closely. The butt end region is formed thick, and therefore its strength is little affected by contact with rocks or other objects on the shore.

According to the present invention, the tape is wound in different modes based on the difference in function between the tip end region and butt end region. The resulting rod, as a whole, is relatively free from a deterioration in strength due to damage done during use on the shore, and is at the same time flexible enough to copy with a sudden pull of fish.

In a further aspect of the invention, a method of manufacturing the rod is provided which comprises the steps of winding around a mandrel a prepreg sheet including reinforcing fibers oriented in one direction and having a width extending over an entire length of the rod; winding, over the entire length of the rod, a prepreg tape including reinforcing fibers oriented in a direction different from the one direction and having a width smaller than the length of the rod; and baking the prepreg sheet and prepreg tape;

wherein the prepreg tape is wound to have adjacent winds partly overlapping each other in a tip end region of the rod, and spaced from each other axially of the rod in a butt end region of the rod.

According to this method, only a single prepreg sheet is used to form an inner layer, which includes reinforcing fibers oriented in one direction and having a width extending over an entire length of the rod. Consequently, the prepreg sheet may be wound on the mandrel free from a spring-back.

Thus, the prepreg sheet may be wound smoothly to facilitate manufacture. In addition, the prepreg tape is wound to form an outer layer to restrict formation of voids or the like which are otherwise readily formed between the outer and inner layers during a winding operation. The absence of voids contributes toward excellent strength.

Other features and advantages of the present invention will be apparent from the following description.

DETAILED DESCRIPTION OF THE PREFERRED EMBODIMENTS

A rod and a method of manufacturing the rod according to the present invention will be described in detail hereinafter with reference to the drawings.

Figure 1:
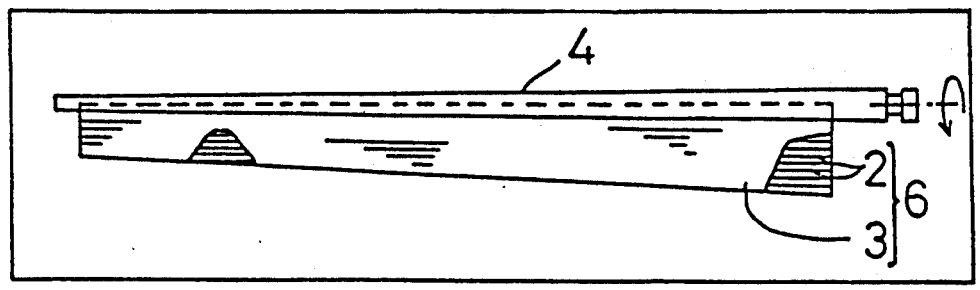
FIG. 1 is a plan view of a prepreg sheet wound on a mandrel.
Figure 2:
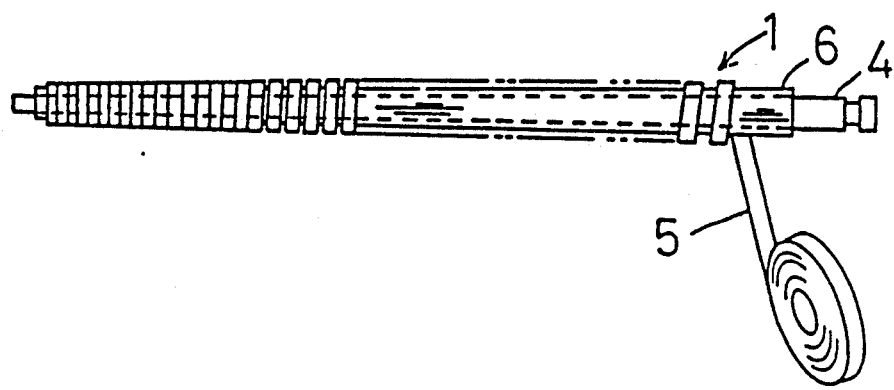
FIG. 2 is a plan view of a prepreg tape wound on the prepreg sheet.

As shown in FIGS. 1 and 2, a prepreg sheet 6 is formed with carbon fibers 2 oriented axially of a rod 1 and impregnated with a resin 3. The prepreg sheet 6 has a width extending over an entire length of the rod 1.

Next, the prepreg sheet 6 is wound in one to three plies on a mandrel 4 having a forward end about 0.5 to 1 mm in diameter, to form an inner layer.

A prepreg in sheet form with carbon fibers oriented circumferentially of the rod 1 is cut to strips. A tape 5 formed of the prepreg strips is wound to form an outer layer.

Figure 3:
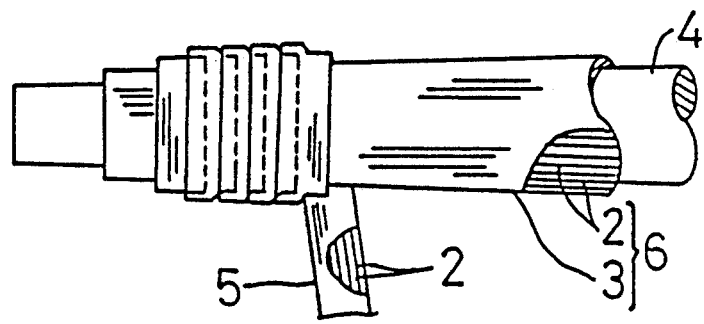
FIG. 3 is a fragmentary plan view of the prepreg tape wound with adjacent winds thereof overlapping each other for a tip end region of a rod, FIGS. 4 (a) and (b) are explanatory views of a rod manufacturing method in another embodiment of the invention, FIGS. 5 (a) and (b) are explanatory views of a rod manufacturing method in a further embodiment of the invention, FIGS. 6 (a), (b) and (c) are explanatory views of a rod manufacturing method in a still further embodiment of the invention.

As shown in FIG. 3, the prepreg tape 5 is wound to have adjacent winds partly overlapping each other in a tip end region of the rod, and spaced from each other axially of the rod in a butt end region of the rod.

A heat-contractive tape (not shown) is wound around the rod as formed above, and then baked to form the rod 1. This rod 1 serves as a hollow tip rod section.

Other embodiments will be described hereinafter.

(1) The carbon fibers in the prepreg sheet 6 may be oriented circumferentially, and not axially, of the rod.

(2) The prepreg tape 5 may be wound to have progressively increasing spaces between adjacent winds toward the butt end of the rod.

Figure 4A:
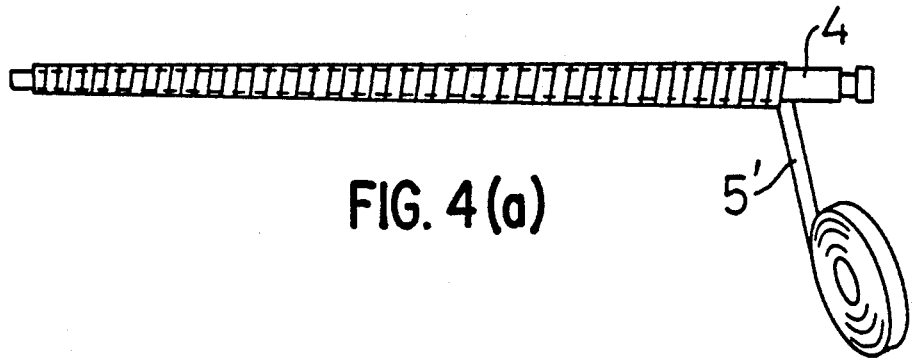
Figure 4B:
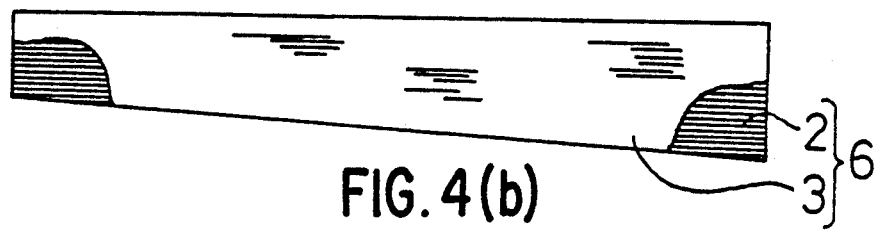

(3) In the foregoing embodiment, the prepreg sheet 6 formed with reinforcing fibers 2 oriented axially of a rod 1 and having a width extending over an entire length of the rod 1 is wound on the mandrel 4 first. Instead, a prepreg tape 5' may be wound on the mandrel 4 in advance as shown in FIG. 4 (a). thereafter, the prepreg sheet 6 shown in FIG. 4 (b) may be wound on surfaces of the prepreg tape 5. Then, a prepreg tape 5 is wound to form the rod as shown in FIGS. 2 and 3.

Figure 5A:
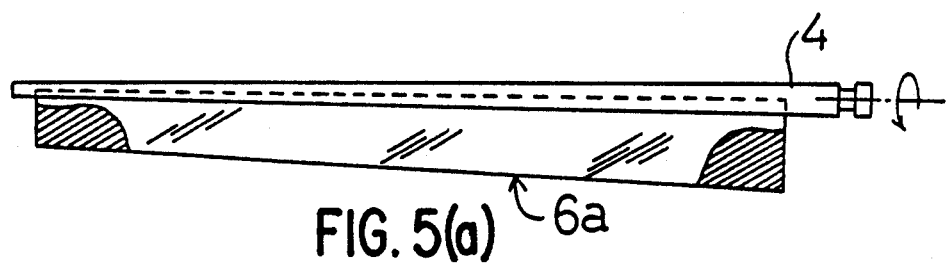
Figure 5B:
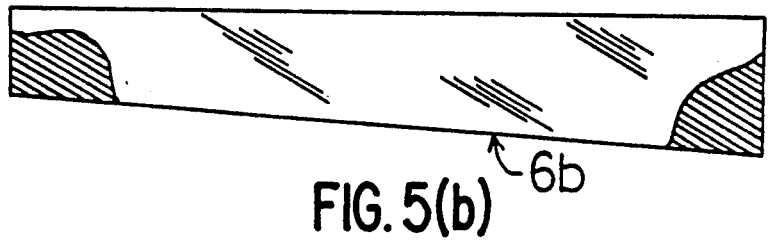

(4) The foregoing embodiment employs the prepreg sheet 6 having the reinforcing fibers oriented axially of the rod. It is also possible to employ a prepreg sheet having reinforcing fibers oriented in a bias direction with respect to the axial direction of the rod. In this case, as shown in FIGS. 5 (a) and (b). A prepreg sheet 6a having bias fibers may be wound first, and then a prepreg sheet 6b having fibers biased in the opposite direction may be wound on the prepreg sheet 6a. Subsequently, the rod is formed as shown in FIGS. 1 through 3. The resulting rod will have an increased strength.

A prepreg sheet having reinforcing fibers biased in opposite, crisscross directions may be used in place of the two prepreg sheets 6a and 6b.

(5) As a further modification, a prepreg sheet with reinforcing fibers oriented circumferentially of the rod and having a width extending over the entire length of the rod is wound on the mandrel first, and then a prepreg sheet with reinforcing fibers oriented axially of the rod and having the width extending over the entire length of the rod is wound on the first-wound prepreg sheet. Subsequently, the rod is formed as shown in FIGS. 1 through 3.

Figure 6A:
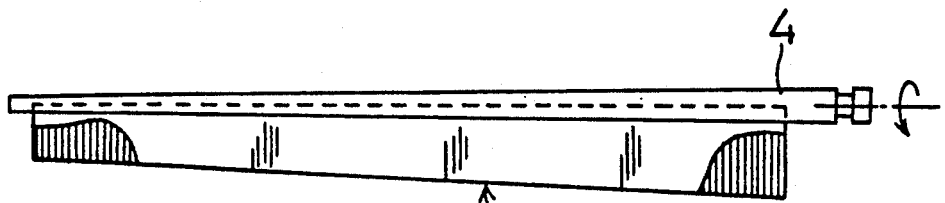
Figure 6B:
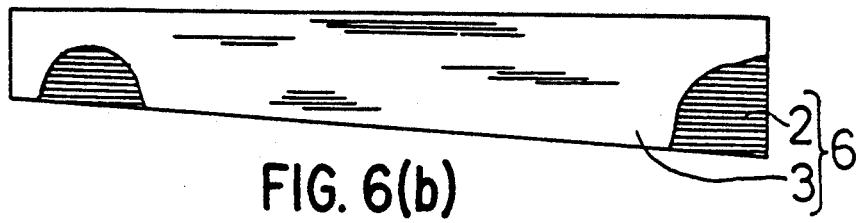
Figure 6C:
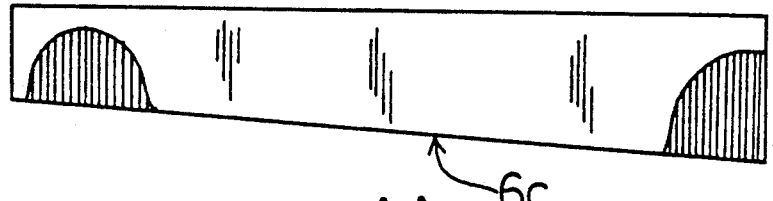
Figure 7:
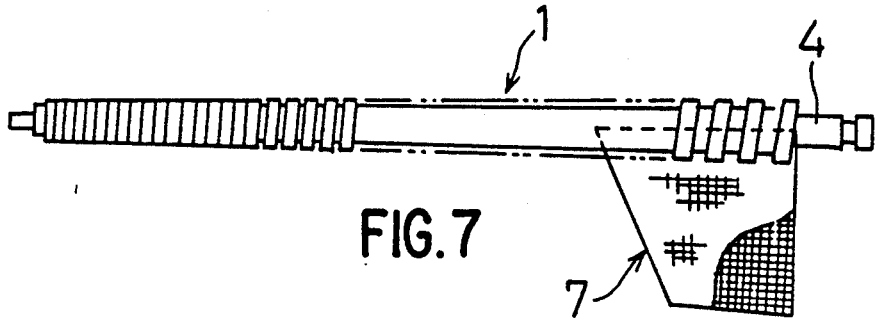
FIG. 7 is an explanatory view of a rod manufacturing method in a still further embodiment of the invention.

As shown in FIGS. 6 (a), (b) and (c), a further prepreg sheet with reinforcing fibers oriented circumferentially of the rod and having the width extending over the entire length of the rod may be wound after winding the second prepreg sheet above with reinforcing fibers oriented axially of the rod and having the width extending over the entire length of the rod. Subsequently, the rod is formed as shown in FIGS. 1 through 3.

Various other combinations of prepreg sheets are conceivable for forming an inner layer. The prepreg sheets may be wound in the order reversed from the order of winding in the above-noted combinations. That is, the prepreg sheet with reinforcing fibers oriented axially of the rod and having the width extending over the entire length of the rod is wound on the mandrel first, and then the prepreg sheet with reinforcing fibers oriented circumferentially of the rod and having the width extending over the entire length of the rod is wound.

(6) After the rod is formed as shown in FIGS. 1 through 3, a pattern winding may be applied to the butt end region to provide a thick end for coupling to another rod. This pattern winding may be applied to all of the preceding embodiments.

(7) The number of winds of each prepreg sheet is not limitative, but may be selected according to purpose or kind of the rod.

What is claimed is:

1. A fishing rod comprising:
   an inner layer formed of a prepreg sheet including reinforcing fibers oriented in one direction and having a width extending over an entire length of the rod; and
   an outer layer formed of a prepreg tape including reinforcing fibers oriented in a direction different from said reinforcing fibers oriented in one direction and having a width less than the length of the rod, said prepreg tape being continuously wound over the entire length of the rod;
   wherein said prepreg tape is wound with a variable winding distance so as to have adjacent winds partly overlapping each other in a tip end region of the rod to conceal and minimize possibility of damage done to the inner layer, and axially spaced from each other in a butt end region of the rod to avoid an increase in rigidity and loss of flexibility.

2. A rod as claimed in claim 1, wherein the reinforcing fibers of said prepreg sheet forming said inner layer are oriented axially of the rod, and the reinforcing fibers of said prepreg tape forming said outer layer are oriented circumferentially of the rod.

3. A fishing rod comprising:
   an inner layer formed of a prepreg sheet including reinforcing fibers oriented axially of said rod, and having a width extending over an entire length of the rod, wherein said inner layer is formed of said prepreg sheet wound in one to three plies on a mandrel having a forward end about 0.5 to 1 mm in diameter; and
   an outer layer formed of a prepreg tape including reinforcing fibers oriented circumferentially of said rod, and having a width less than the length of the rod, said prepreg tape being continuously wound on said inner layer over the entire length of the rod; and
   wherein said prepreg tape is wound with a variable winding distance so as to have adjacent winds partly overlapping each other in a tip end region of the rod to conceal and minimize possibility of damage done to the inner layer, and axially spaced from each other in a butt end region of the rod to avoid an increase in rigidity and loss of flexibility.

4. A rod as claimed in claim 3, further comprises a hollow section in the tip end region.

* * * * *